United States Patent

[11] 3,594,655

[72] Inventor Frederick Reisfeld
Commach, N.Y.
[21] Appl. No. 839,927
[22] Filed July 8, 1969
[45] Patented July 20, 1971
[73] Assignee Potter Instrument Company, Inc.
Plainview, N.Y.

[54] CLOCK SIGNAL GENERATOR USING A SAWTOOTH OSCILLATOR WHOSE FREQUENCY IS CONTROLLED IN DISCRETE STEPS
7 Claims, 2 Drawing Figs.

[52] U.S. Cl. .......... 331/14, 331/1 A, 331/18, 331/25
[51] Int. Cl. .......... H03b 3/04
[50] Field of Search .......... 331/1 A, 18, 25, 27, 14

[56] References Cited
UNITED STATES PATENTS
3,156,874 11/1964 Verdibello .......... 331/27
3,376,517 4/1968 Reynolds .......... 331/18

*Primary Examiner*—Roy Lake
*Assistant Examiner*—Siegfried H. Grimm
*Attorney*—Laurence J. Marhoefer

ABSTRACT: A clock signal generator for generating timing signals in response to more or less regularly occuring signals in which the frequency of a sawtooth oscillator is varied in discrete steps in accordance with the time relationship between the oscillator output and the regular occurring signal.

INVENTOR
FREDERICK REISFELD
BY Laurence J. Marhoefer
ATTORNEY

INVENTOR
FREDERICK REISFELD
BY Laurence J. Marhoefer
ATTORNEY

CLOCK SIGNAL GENERATOR USING A SAWTOOTH OSCILLATOR WHOSE FREQUENCY IS CONTROLLED IN DISCRETE STEPS

BACKGROUND OF THE INVENTION

This invention relates to a signal generator for generating clocking signals in response to a self-clocking magnetic recording and, more particularly, to an improved variable frequency oscillator for generating the clocking signals.

In the digital computer art there are a number of self-clocking recording techniques for recording binary information on magnetic media such as magnetic tapes or magnetic discs. Phase-encoded and double-frequency-encoded recordings are two widely used examples of such techniques. Another self-clocking recording technique in use is described in U.S. Pat. No. 3,374,475.

Although the variable-frequency oscillator of this invention may be used to generate clock signals in response to various self-clocking recordings, the embodiment of the invention described in this application is for use with a phase-encoded recording on magnetic tape.

In prior art clock signal generators, the frequency of a free-running sawtooth generator is varied by a linear error detector to maintain the generator in synchronism with the recorded signal. That is, in prior art systems, the magnitude of the signal applied to vary the frequency of the generator is proportional to any variation in phase between recorded signal and the sawtooth generator signal.

WHile generally satisfactory, such prior art linearly phase-controlled variable-frequency oscillators cannot be synchronized with the recorded signal when there is an initial large variation between the recorded signal frequency and the nominal frequency of the recording. It will be appreciated that in magnetic tape recording it is not unusual to experience initial variations in tape speed both when recording and when reading information from the tape due to the fact that the tape operates in a start-stop mode. These tape speed variations in recording and reading may be cumulative and result in large signal frequency variations when reading information from the tape.

An object of this invention is the provision of an improved clock generator for self-clocking magnetic recordings which is capable of locking into synchronism in the presence of large initial variations in frequency of the recorded signal.

ANother object of the invention is the provision of such a clock signal generator which is simple as compared to prior art variable frequency oscillators.

SUMMARY OF THE INVENTION

Briefly, this invention contemplates the provision of a clock generator in which the time of occurrence of the recorded clock signals is compared with the output of a variable-frequency sawtooth oscillator. The output of the sawtooth oscillator is electronically divided into three or more zones. The magnitude of the error signal applied to correct the frequency of the sawtooth oscillator varies in discrete steps as a function of the zone in which the recorded signal falls.

BRIEF DESCRIPTION OF THE DRAWINGS

Having briefly described this invention, it will be described in greater detail along with other objects and advantages in the following detailed description of a preferred embodiment which may be best understood by reference to the accompanying drawings. These drawings form part of the instant specification and are to be read in conjunction therewith. Like reference numerals are used to indicate like parts in the various views, in which.

DESCRIPTION OF THE PREFERRED EMBODIMENTS

Figure 1:
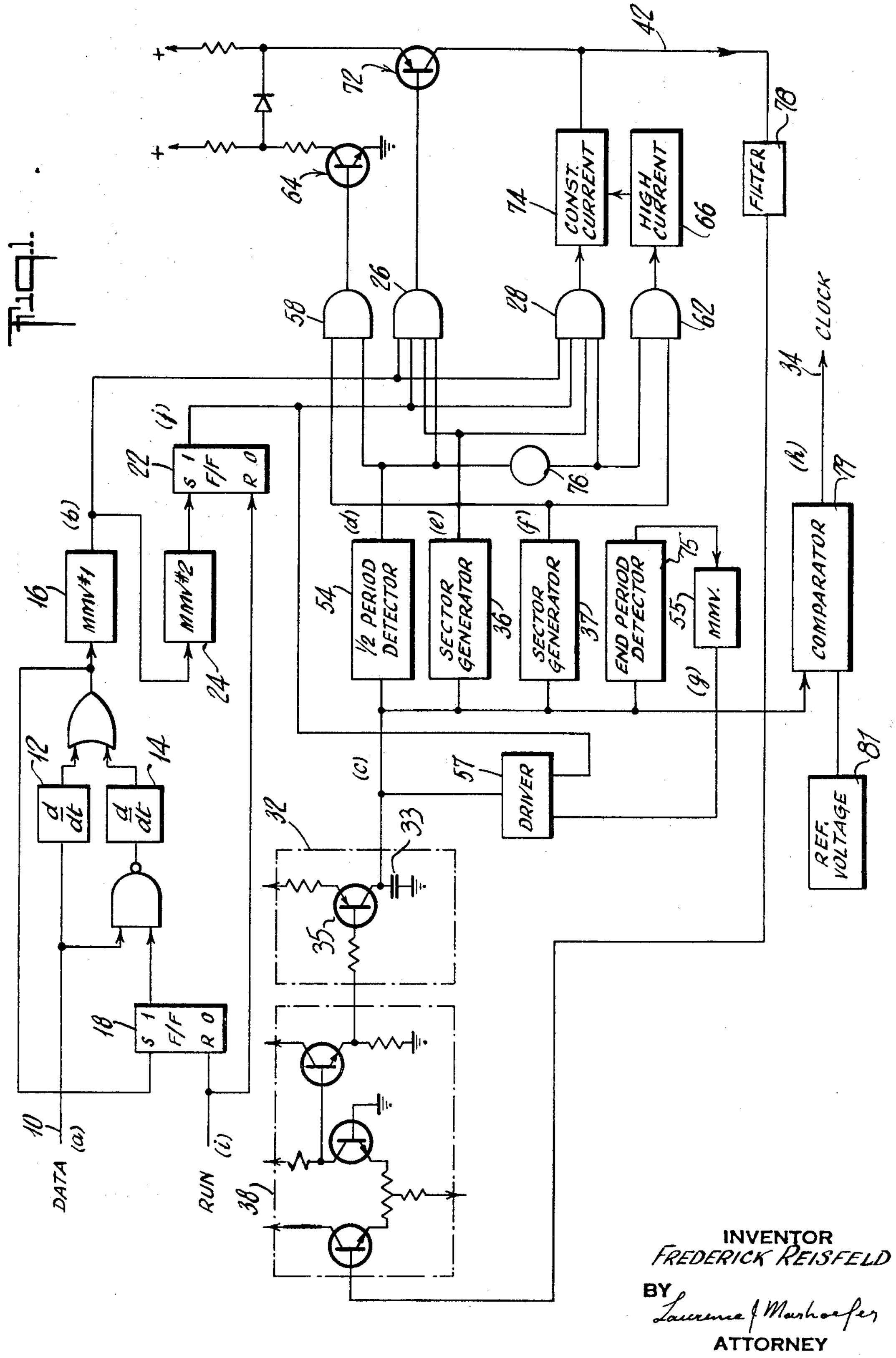
FIG. 1 is a diagram (partially in block form and partially in schematic form) of one embodiment of the invention.

Referring now to FIG. 1 of the drawings, an input terminal 10 receives a generally squared input signal that has been derived from a self-clocking phase-encoded recording in a manner well-known to those skilled in the art. FIG. 2*a* shows this waveform. Terminal 10 is coupled to a monostable multivibrator 16 via a pair of differentiating circuits 12 and 14; monostable multivibrator 16 provides a narrow output pulse (shown in FIG. 2*b*) for each change in the level of the signal coupled to terminal 10.

It should be noted that logic circuitry associated with a pair of flip-flops 18 and 22 prevent the variable frequency oscillator from tracking the incoming signal until the first rising edge (postive going) of the data waveform is received at terminal 10. The reason for this delay is that in computer industry compatible self-clocking recordings the first falling (or ground edge going) of the data signal can be asynchronous with the recorded information block. The first positive-going edge sets a negative-transition-inhibit flip-flop 18. Each transition will trigger monostable multivibrator (MMV) 16; this MMV produces a uniform pulse for each transition. The first pulse from MMV 16 is used to set MMV 24. MMV 24 is set for a delay of one-half the variable-frequency oscillator period or one-fourth the data cell time. At the end of this delay the flip-flop 22 is set, starting the variable-frequency oscillator.

The clocking signal is generated by recordings free-running sawtooth generator 32 which preferably has a natural frequency of oscillation which is somewhat lower than the nominal frequency or recorded transition. The output frequency of the sawtooth generator 32 is variable; this output frequency tracks the data frequency in a manner more fully described hereinafter. It should be noted that when the sawtooth generator output is locked to the input signal at terminal 10, its frequency is twice the data frequency for phase and double frequency recordings owing to the fact that there are two recorded signals for each data signal in such recordings.

In a preferred embodiment of the invention, the output of the sawtooth generator 32 is divided into five regions: a central region (marked 50 in FIG. 2) and two regions respectively above the central region (52 and 46) and two regions respectively below (44 and 48) the central region. Signals to correct the frequency of the sawtooth oscillator are applied in dependence upon the region in which the edge of the data waveform occurs.

The sawtooth generator 32 comprises essentially a capacitor 33 charged from a constant current source which includes transistor 35. The magnitude of the constant charging current (hence the time required for the sawtooth waveform to reach a certain potential) is a function of the signal coupled to the base of transistor 35 via a DC amplifier 38. If the edge of the data waveform falls in region 44, a relatively large constant current pulse is applied to a low-pass filter 78 via generator 72. The polarity of this pulse is such that the output of filter 78, which is coupled to transistor 35 via DC amplifier 38, increases the charging rate of capacitor 33. If the edge of the data waveform falls in the region 48, a rotatively smaller constant current pulse is coupled to filter 78. This constant current pulse also results in an increase in the charging rate of capacitor 33. However, this increase is less than that produced when the edge of the data waveform falls in region 44.

Similarly, if the edge of the data waveform falls in region 46, a relatively large constant current pulse is applied to filter 78 and will result in a decrease in the charging rate of capacitor 33; and, if the edge falls in region 52, a relatively smaller constant current pulse is applied to filter 78 to again decrease the charging rate.

If the edge of the data waveform falls in the very narrow midregion 50 there is no feedback current pulse coupled to filter 78. It should be noted, however, that in the absence of a corrective feedback signal, amplifier 38 so biases the base of transistor 35 that the charging rate of the capacitor is equal to the data transition rate.

The output of the sawtooth generator 32 is coupled to two inputs of a four-input comparator 36 denominated sector generator in the drawing and elsewhere in this specification; the other two inputs (not shown) are coupled to reference potential source. Comparator 36 provides an enabling input to AND gates 26 and 28 so long as the magnitude of the output of sawtooth generator is in any region except region 50. In a similar manner, the output of sawtooth generator is also coupled to two inputs of another four-input comparator 37 denominated sector generator in the drawing and elsewhere in this specification whose other two inputs (not shown) are coupled to reference potential source. Comparator 37 provides an enabling input to a pair of AND gates 58 and 62 so long as the magnitude of the output of the sawtooth generator output is in region 44 on 46. The Fairchild No. 711 integrated circuit available from Fairchild Semiconductor, a division of Fairchild Camera and Instrument Corporation, 313 Fairchild Drive, Mountain View, California, is a suitable four-input comparator.

A lead couples the output of gate 26 to a current generator which includes a transistor 72. When all the inputs to AND gate 26 are logically TRUE, gate 26 supplies base current for transistor 72, turning on transistor 72. A lead 42 couples the collector of transistor 72 via a low-pass filter 78 to DC amplifier 38.

A lead couples the output of an AND gate 58 to current control generator which includes a transistor 64. Transistor 64 is so biased that it is normally conducting; when all inputs to gate 58 are logically TRUE an output from this gate 58 turns off transistor 64. A diode couples the collector of transistor 64 to the emitter of transistor 72 so that when transistor 64 turns off, the output current of transistor 72 increases in an incremental step with a constant of base drive for transistor 72. Thus, when gate 26 is enabled a constant current output from transistor 72 is coupled to filter 78; this output is of such polarity that it increases the charging rate of capacitor 33 and hence increases the oscillating frequency of generator 32. When gates 26 and 58 are both enabled the output current from transistor 72 is larger, increasing the frequency of oscillator 32 by a proportionately larger amount.

In a similar manner, comparators 36 and 37 are also coupled respectively to AND gates 28 and 62, and the outputs of gates 28 and 62 are coupled respectively to current generators 74 and 66. Current generators 74 and 66 are similar to generators 72 and 64 whose operation has been previously explained. The outputs of generators 74 and 66 are of opposite polarity from the outputs of generators 72 and 64 and hence tend to decrease the oscillating frequency of oscillator 32.

Although separate comparators could be employed for each of the sectors 44, 48, 50, 52, and 46, the two four-input comparators 36 and 37 are sufficient since the sawtooth waveform may be divided into two equal parts by a comparator 54 which serves as a half-cycle detector. Leads couple the output of the two-input comparator 54 directly to AND gates 58 and 26. An inverter 76 couples the output of the two-input comparator 54 also to AND gates 28 and 62. One output of comparator 54 is coupled to the output of sawtooth generator 32 and its other input is coupled to a reference potential source. Comparator 54 has a TRUE output so long as the output potential of sawtooth generator 32 is below its midpoint level. Thus, gates 26 and 58 have enabling inputs during the first half of each sawtooth cycle and gates 28 and 62 have enabling inputs during the second half of each cycle.

THe output of sawtooth generator 32 is coupled to one input of another two-input comparator 75 which serves as an end of cycle detector. The output of comparator 75 is coupled via a monostable multivibrator 55 to a capacitor discharge driver circuit 57, while its other input is coupled to a reference potential source; comparator 75 produces an output signaling the discharge capacitor 33 when the output of the sawtooth oscillator reaches a certain level. It should be noted that discharge driver 57 is also coupled to the output of flip-flop 22 so that the capacitor 33 discharges upon receipt of the first rising edge of the data input signal.

The clock signal itself is generated by still another two-input comparator 79 one of which inputs is coupled to the output of sawtooth oscillator 32 and the other of which is coupled to a reference voltage source 81. The output of the comparator rests at a positive potential so long as the level of the sawtooth input is below its midpoint and rest at ground potential so long as the sawtooth output is above its midpoint.

Figure 2:
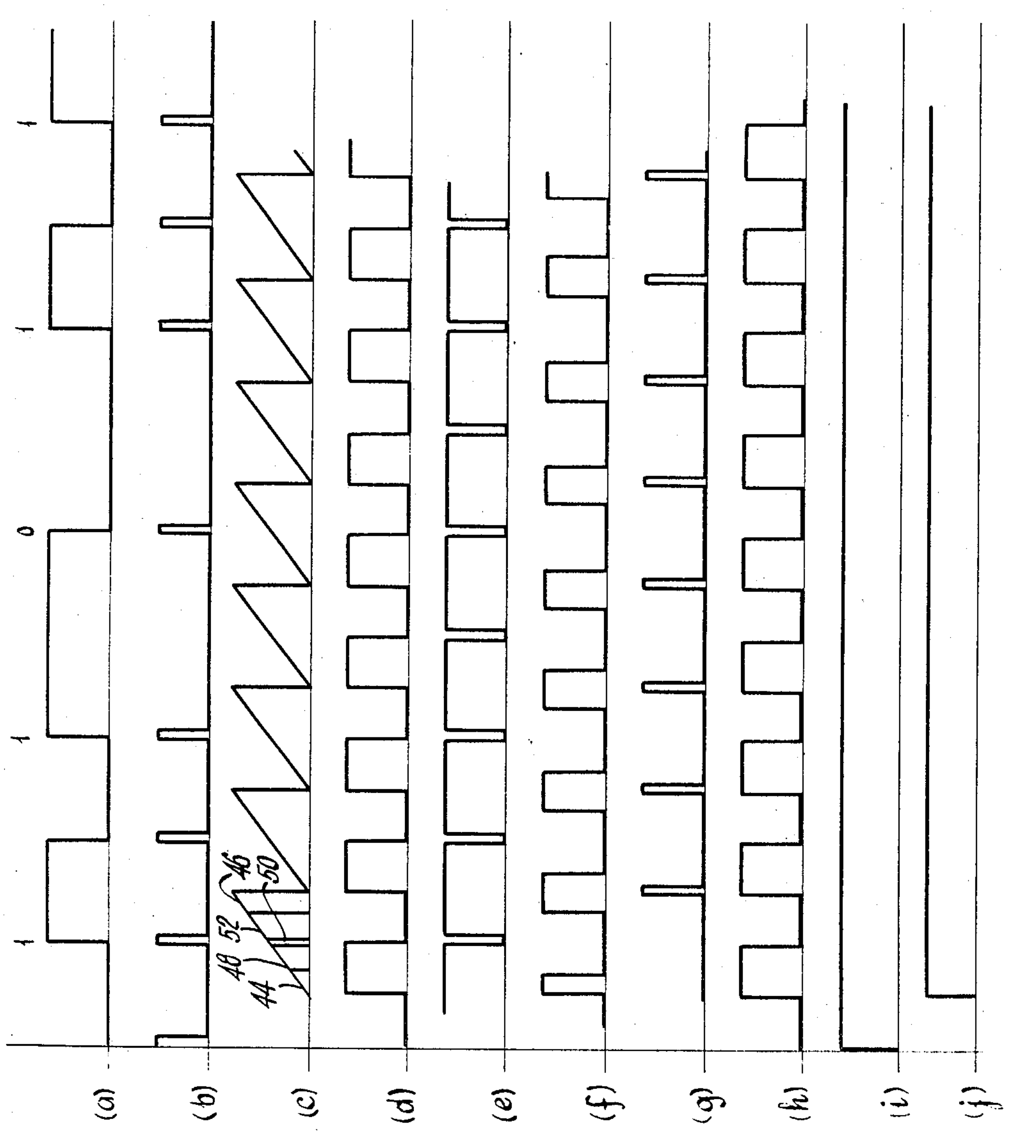
FIG. 2 shows time-related idealized waveforms at various point in FIG. 1.

Referring now to FIG. 2 as well as FIG. 1, in operation, sector generator 36 provides an enabling input to AND gates 26 and 28 whenever the output level of sawtooth generator 32 is in any region except region 50. Stated differently, generator 36 provides enabling inputs whenever the output level of generator 32 is in region 44 or 48 or 52 or 46. Sector generator 37 provides an enabling input to AND gates 58 and 62 whenever the output level of sawtooth generator 32 is in region 44 or region 46. As shown in FIG. 2*d*, the half period detector 54 provides an enabling input to gates 58 and 26 during the first half of each period and enabling inputs to gates 28 and 62 during the second half of each period. Thus, if the output pulse of multivibrator 16 occurs in region 48, AND gate 26 alone is enabled by and for the duration of the pulse from multivibrator 16. While the inputs to gate 26 are TRUE, current generator 72 generates a constant current output signal to increase the charging rate of capacitor 33. If the output pulse from multivibrator 16 occurs in region 44, at that time gates 58 and 26 are both enabled and a relatively larger output pulse is coupled from generator 72 to sawtooth generator 32 via filter 78 and DC amplifier 38 to again increase the charging rate of capacitor 33. A similar operation occurs if the output of multivibrator 16 falls in region 52 or 46 except, of course, current generators 74 and 66 provide a current which decreases the charging rate of capacitor 33. If the pulse from multivibrator 16 falls in region 50, none of the gates 26, 58, 28, or 62 is enabled and no corrective current pulse is fed back to sawtooth oscillator 32.

Thus, it will be appreciated that the objects of this invention have been accomplished by varying the feedback signal in discrete steps as a function of the position of the data waveform with respect to the sawtooth generator, a relatively simple variable frequency clock oscillator is provided that can lock into synchronism in the presence of large initial recorded frequency variations.

It will be understood that certain features and subcombinations are of utility and may be employed without reference to other features and subcombinations. This is contemplated by and is within the scope of the claims. It is further obvious that various changes may be made in details within the scope of the claims without departing from the spirit of the invention. It is, therefore, to be understood that this invention is not limited to the specific details shown and described.

What I claim is:

1. A variable-frequency oscillator to generate a signal synchronized with a signal derived from a self-clocking recording comprising in combination:

a variable-frequency, free-running oscillator having an output terminal and an input terminal, said oscillator generating a periodic signal at said output terminal which varies from an initial value to a final value thereby defining a time interval, said oscillator including means responsive to a feedback signal coupled to said input terminal for varying the frequency of said periodic signal, means responsive to said oscillator signal for generating at least;

a first sectorizing signal during the interval when said periodic signal is between an initial value and a first predetermined value reached in less then one-half said time interval, a second sectorizing signal during the interval said periodic signal is between a second predetermined value reached in greater than one-half said time interval and said final value, means responsive to said first sectorizing signal and said signal derived from said self-clocking recording to generate a first feedback pulse of a predetermined magnitude and polarity, means responsive to said second sectorizing signal and said signal derived from said self-clocking recording to generate a second feedback signal of a predetermined magnitude and polarity, and means for coupling said first and second feedback pulses to said oscillator input terminal to vary the frequency of said oscillator in discrete steps.

2. A variable-frequency oscillator as in claim 1 further including means for generating two sectorizing signals during the interval said oscillator signal is between said initial value and said first predetermined value, means for generating two sectorizing signals during the interval said oscillator signal is between said second predetermined value and said final value, means respectively responsive to the coincidence of the four sectorizing signals and said signals derived from said self-clocking recording to generate four discrete feedback pulses differing respectively in magnitude and/or polarity, and means for coupling said feedback pulses to said input terminal of said oscillator.

3. A variable-frequency oscillator as in claim 1 in which there is a dead zone interval between said first predetermined value and said second predetermined value.

4. A variable-frequency oscillator as in claim 2 in which there is a dead zone interval between said first predetermined value and said second predetermined value.

5. A variable-frequency oscillator as in claim 1 further including means responsive solely to the initial positive-going edge of the signal derived from said self-clocking recording to set said oscillator to its initial value.

6. A variable-frequency oscillator as in claim 4 further including means responsive solely to the initial positive-going edge of the signal derived from said self-clocking recording to set said oscillator to its initial value.

7. A method of generating clocking signals which are synchronized with signals derived from a self-clocking recording comprising the steps of:

generating a signal having a sawtooth waveform of a predetermined frequency and varying periodically in magnitude between an initial value and a final value to define a time interval, increasing the frequency of said sawtooth wave signal a predetermined amount when the signal derived from said self-clocking recording occurs when the sawtooth waveform is between said initial value and a value less then one-half said final value, and decreasing the frequency of said sawtooth signal a predetermined amount when the signal derived from said self-clocking recording occurs when the sawtooth waveform is between a value greater than one-half said final value and said final value.